United States Patent Office 3,700,493
Patented Oct. 24, 1972

3,700,493
CELLULOSIC PRODUCTS TREATED WITH IMPROVED QUATERNARY AMMONIUM ELECTROCONDUCTIVE ADDITIVES FROM VINYL-AROMATIC POLYMERS
Lawrence F. Sonnabend, Midland, Mich., assignor to The Dow Chemical Company, Midland, Mich.
No Drawing. Continuation-in-part of abandoned application Ser. No. 78,639, Oct. 6, 1970, which is a division of application Ser. No. 773,309, Nov. 4, 1969, now Patent No. 3,607,989. This application June 16, 1971, Ser. No. 153,889
Int. Cl. B44d 1/18; C08f 27/03
U.S. Cl. 117—201                                              7 Claims

ABSTRACT OF THE DISCLOSURE

Electroconductive cellulosic products with improved color and color stability are obtained by treating a base cellulosic product with a quaternary ammonium additive prepared by chloromethylation and amination of an essentially linear vinylaromatic polymer containing less than 0.3 weight percent residual ethylenic unsaturation. The treated products have improved stability as shown by retention of surface brightness and decreased yellowing. They are particularly useful in preparing reprographic printing paper.

BACKGROUND

This application is a continuation-in-part of application Ser. No. 78,639 filed Oct. 6, 1970 and now abandoned, which in turn is a division of application Ser. No. 773,309 filed Nov. 4, 1969 and now U.S. Pat. 3,607,989.

The development of modern duplicating methods has created a large demand for electroconductive additives to increase the electroconductivity of reprographic paper without serious loss of other desirable properties including color stability. Particularly effective as an electroconductive additive is the poly(vinylbenzyl quaternary ammonium) resin described by Silvernail and Zembal U.S. Pat. 3,011,918 and Doggett and Cady U.S. Pat. 3,110,621. This resin can be prepared by chloromethylation and amination of a soluble polyvinylaromatic resin as described by Jones U.S. Pat. 2,694,702.

The increasingly rigid color standards for high quality reprographic paper spurred study of the batch-to-batch color variation from light yellow to deep yellow brown in the quaternary ammonium polymers produced by the Jones process. Treatment of the polymers by conventional techniques for reducing color, such as hydrogenation, treatment with activated carbon or a chemcial reducing agent, failed to give the required improvement in color and color stability.

STATEMENT OF THE INVENTION

A detailed study of the Jones process revealed that the primary source of the color and color instability was the presence of residual ethylenic unsaturation in the essentially linear vinylaromatic resin prior to chloromethylation. Removal of this residual ethylenic unsaturation so that the residual ethylenic unsaturation is less than 0.3 wt. percent substantially eliminates color-forming side reactions during chloromethylation and amination. The resulting quaternary ammonium polymer meets the color standards for electroconductive resins. The improved color and color stability is visually evident at each stage from the chloromethylated polymer to the quaternary ammonium additive to the treated reprographic paper stock.

This invention is an improvement in the technology of Jones U.S. Pat. 2,694,702 for the preparation of quaternary ammonium vinylaromatic polymers particularly useful as electroconductive additives for paper. More specifically the improvement gives an essentially colorless water soluble quaternary ammonium polymer having an average of about 0.1–1.0 quaternary ammonium groups per aromatic group, said polymer being prepared by chloromethylation and amination of an essentially linear vinylaromatic polymer containing less than 0.3 weight percent residual ethylenic unsaturation. The intermediate chloromethylated polymer is toluene soluble with an optical density at 400 mu of less than about 0.10 as a 10 wt. percent solution in tetrahydrofuran.

The improved water soluble quaternary ammonium vinylaromatic polymer has superior color and color stability essential for a high quality electroconductive additive. The color stability and brightness of an electrographic paper treated with this improved polymer is also significantly enhanced.

GENERAL DESCRIPTION

Vinylaromatic polymers

Jones U.S. Pat. 2,694,702 describes a process for preparing soluble chloromethylated polymers of styrene and $\alpha$-methylstyrene which can be aminated with a tertiary amine to obtain a water-soluble cationic polymer containing about 0.1–1.0 quaternary ammonium groups per aromatic group. For use as electroconductive additives, a polymer containing about 0.4–1.0 quaternary ammonium groups per aromatic group is particularly desirable. Other soluble vinylaromatic polymers including polymers of vinyltoluene, vinylethylbenzene and similar $C_8$–$C_{14}$ monovinylaromatic monomers can be made by this process.

In examining the color instability of the electroconductive quaternary ammonium polymers prepared by the Jones' process, it was discovered that soluble polyvinylaromatic resins prepared by the Jones' process generally contained prior to chloromethylation about 1–5 wt. percent residual ethylenic unsaturation calculated as vinyl groups ($-CH=CH_2$). Furthermore, to obtain the desired light colored and stable quaternary ammonium product, it is essential to reduce this residual ethylenic unsaturation to less than about 0.3 wt. percent prior to chloromethylation.

To reduce the residual ethylenic unsaturation prior to chloromethylation, hydrogenation as described in my parent application Ser. No. 773,309 filed Nov. 4, 1968 and now U.S. Pat. 3,607,989 is particularly effective. A wide variety of catalysts including Raney nickel, palladium, platinum, and rhodium can be used under mild conditions (20°–60° C., 2–20 atm. $H_2$) while less active catalysts such as supported nickel, copper chromite, promoted iron or tungsten catalysts can be used with more vigorous conditions (20°–200° C., 20–300 atm. $H_2$).

To provide more effective contact between the soluble polymer and heterogeneous catalyst, and to facilitate heat transfer, an inert solvent or diluent can be used. Aromatic or saturated aliphatic hydrocarbons such as benzene, toluene, n-heptane, and cyclohexane as well as hydrocarbon mixtures as petroleum ether are suitable. Also saturated $C_1$–$C_4$ chlorinated solvents stable under the hydrogenation conditions, such as methylene chloride, 1,2-dichloroethane, carbon tetrachloride, 1,2-dichloropropane, can be used. Indeed such chlorinated solvents are also effective solvents for the subsequent chloromethylation and amination.

The catalytic hydrogenation of the polyvinyl-aromatic resin is carried out until a residual ethylenic unsaturation of less than about 0.3 wt. percent calculated as vinyl unsaturation ($-CH=CH_2$) is obtained. Then the hydrogenated resin is chloromethylated and aminated to yield a soluble quaternary ammonium electroconductive resin.

Alternately the vinylaromatic polymer containing a high residual ethylenic unsaturation can be purified by fractionation using a suitable column to remove the lower molecular weight species which normally have a higher ethylenic unsaturation.

Yet another method is using an anionic alkali metal initiator for preparing the essentially linear vinyl-aromatic polymer. It has been discovered that alkali metal initiators such as an alkali metal alkyl or aryl, an alkali metal benzylic or polynuclear hydrocarbon complex, or similar alkali metal "living" polymer initiators give narrow molecular weight vinylaromatic polymers which contain less than 0.3 wt. percent residual ethylenic unsaturation.

More specifically Uraneck et al. U.S. Pats. 3,135,716 and 3,159,587 describe the preparation and use of a variety of polylithium alkyl and aryl initiators, such as 1,4-dilithiobutane, or 1,2-dilithio - 1,2 - diphenylhexane. Other similar initiators are n-butyl lithium, α-phenylethyl potassium and α-methylstyrene sodium. In U.S. Pat. 3,041,312 Boyd describes the anionic polymerization of styrene and similar monovinylaromatic monomers using an alkali metal complex of a polynuclear aromatic hydrocarbon aryl catalyst, such as sodium naphthalene or sodium triphenylmethyl. Other alkali metal complexs of very weakly acidic aromatic hydrocarbons having a $pK_a$ greater than about 27 are useful initiators.

As described by Szwark U.S. Pat. 3,050,511 polymerizations initiated by these alkali metal compounds or complexes in an anhydrous media are characterized by the absence of chain termination and yield "living" polymers with a reactive anionic end group. Such polymers have a relatively narrow molecular weight and low residual unsaturation.

In practice a vinylaromatic monomer is dissolved in a suitable inert liquid diluent. Hydrocarbons such as benzene, toluene, butane, hexane, are frequently employed with lithium and sodium alkyl catalysts. Ethers such as tetrahydrofuran, dioxane, dimethyl ether, and dimethyl glycol ether are common with sodium naphthalene and similar alkali metal polycene complex initiators. The polymerization is normally carried out with about 0.005–0.04 mole of alkali metal initiator per mole of monomer at a temperature of about $-120°$ C. to $+200°$ C. With styrene a temperature of about 0° to 150° C. is preferred while with α-methylstyrene the preferred temperature is about 0° to 50° C. When the desired molecular weight is obtained, polymerization is terminated by addition of a chain terminating agent such as oxygen, carbon dioxide, or water.

Still other means may be used to prepare the vinylaromatic polymer used as a matrix for the quaternary ammonium electroconductive additive. To achieve the requisite color and color stability, it is essential that the polymer have a residual ethylenic unsaturation of less than 0.3 wt. percent. Also to obtain a water-soluble quaternary ammonium electroconductive additive, an essentially linear vinylaromatic polymer with a weight average molecular weight of about 2,500 to 250,000, preferably about 15,000 to 60,000, is desired.

Chloromethylation and amination

Suitable processes for chloromethylation and amination of the soluble vinylaromatic polymers are well known. Particularly satisfactory is chloromethylation with chloromethyl methyl ether followed by amination with an aqueous solution of a tertiary aliphatic amine such as trimethylamine, dimethylbutylamine, triethanolamine, or dimethylisopropanolamine as described by Jones U.S. Pat. 2,594,-702. At least 0.1 and preferably about 0.4–1.0 chloromethyl groups per aromatic group are added to give a toluene soluble chloromethylated polymer useful in the synthesis of the quaternary ammonium electroconductive polymer. With an initial vinylaromatic polymer having a weight average molecular weight of about 15,000 to 60,000, the chloromethylated polymer containing about 0.4–1.0 chloromethyl groups per aromatic group can have a molecular weight of about 20,000 to 100,000.

Amination gives a quaternary ammonium polymer with a quaternary ammonium content equivalent to the chloromethyl groups. Such polymers containing about 0.1–0.3 quaternary ammonium groups per aromatic group are generally readily dispersed in water. The vinylaromatic polymers with about 0.4–1.0 quaternary ammonium groups per aromatic group are normally water soluble.

Electroconductive paper coating

In preparing reprographic paper, a base stock paper is usually treated with an electroconductive resin prior to applying a photoconductive coating such as finely divided zinc oxide in a suitable insulating binder. The improved quaternary ammonium electroconductive resin is generally applied to the preformed paper stock as an aqueous solution containing about 5–40 wt. percent of the electroconductive resin. It can be applied by spraying, dipping, brushing, calendering or other conventional techniques for impregnating or coating paper stock. Depending on the specific electroconductive properties desired, it can be incorporated by surface coating on one or both sides of the sheet, or by impregnating the entire sheet. Preferably it is applied from aqueous solution at the size press or calender stack of the paper machine. But it also may be applied in a subsequent coating or padding operation.

Advantageously, the electroconductive resin is applied by treating the paper sheet with an aqueous solution or dispersion containing about 5–40 weight percent of the resin to obtain a substantially uniform coating in an amount effective to increase the electroconductivity of the treated paper. Normally a pick up of at least 1 and preferably about 2–20 wt. percent electroconductive resin is desirable. For coarse paper or maximum conductivity for special purposes, greater amounts can be used.

Because of the compatibility of the improved electroductive resin with many conventional paper coating additives including binders and thickeners, the additive solution can be readily formulated for particular properties. For example, a cellulose ether or other thickener may be desirable to minimize surface penetration.

To illustrate further the present invention, the following examples are given. Unless otherwise stated, all parts and percentages are by weight. The ethylenic unsaturation is determined by standard UV and iodine number analyses. The Gardner color analyses are determined by ASTM Method D–154–47.

EXAMPLE 1

Conventional polystyrene product (A) To illustrate prior practice, a toluene soluble, essentially linear polystyrene was prepared by thermal polymerization of styrene as described by Jones U.S. Pat. 2,694,702. This soluble polystyrene had an average molecular weight of about 25,000 and contained 2.96% ethylenic unsaturation calculated as vinyl groups.

Using the Jones process, 62 parts (0.60 mole) of the soluble polystyrene was chloromethylated by adding to a solution of 191.5 parts (2.38 moles) of chloromethyl methyl ether and 12.7 parts (0.16 mole) zinc oxide in 176.5 parts of 1,2-dichloroethane cooled to 10° C. The mixture was held at 45°–47° C. for 6 hours to give a chloromethylated polystyrene containing an average of 0.722 chloromethyl groups per aromatic group. The product solution was washed with water and then with dilute aqueous sodium hydroxide.

To the solution of chloromethylated polystyrene in 1,2-dichloroethane was added 61 parts of water and 270 parts (1.16 moles) of 25% aqueous trimethylamine. The mixture was stirred at 35° C. for 1.5 hours before stripping the 1,2-dichloroethane, excess amine and a portion of the water under reduced pressure at 40°–60° C. The final product was a dark yellow-brown aqueous solution containing 32.6% resin solids and having a Brookfield viscosity of 133 centipoises and a Gardner color of between 8 and 9.

(B) A commercially available quaternary trimethylammonium polystyrene electroconductive resin prepared by essentially the same process using a peroxide catalyzed polystyrene with an average molecular weight of about 25,000 had as a 20% aqueous solution a Brookfield viscosity of 20 cps. at 25° C. and a Gardner color rating of 8.

(C) In an attempt to improve the color of the quaternary ammonium product of Example 1(A), two 100 part samples of the 32.6% solution were treated with 5 parts and with 10 parts of 20% aqueous sodium bisulfite solutions without discernible change in the Gardner rating. Treatment of a third 100 part sample with about 10 parts of activated charcoal also failed to yield any significant improvement in color. Similarly hydrogenation of the final aqueous product is ineffective in reducing the color.

EXAMPLE 2

Hydrogenated polystyrene product (A) To a solution of 200 parts of the soluble, polystyrene described in Example 1(A) (2.96% ethylenic unsaturation) in 200 parts cyclohexane was added 2 parts of 5% palladium on charcoal catalyst. The mixture was hydrogenated in a Parr bomb at room temperature with a hydrogen pressure of about 3 atmospheres for 4 hours. After removing the catalyst and cyclohexane, a soluble polystyrene was obtained which contained 0.12% residual ethylenic unsaturation.

Using the method of Example 1, 46.5 parts of the hydrogenated polystyrene was chloromethylated and quaternized with trimethylamine. The resulting product contained an average of 0.77 quaternary ammonium groups per aromatic group, and had a viscosity of 120 cps. as an aqueous solution containing 32.1% resin solids. Its Gardner color was between 2 and 3.

(B) In a similar experiment 200 parts of the soluble polystyrene in 200 parts 1,2-dichloroethane was hydrogenated for 4.5 hours at 35–40° C. with about 7 atm. hydrogen and 3.5 parts of Raney nickel catalyst. The residual unsaturation was below 0.2% and the chloromethylated and aminated product had a Gardner color of 3.

(C) A mixture of 875 parts of a soluble polystyrene containing 2–3% residual unsaturation, 875 parts of 1,2-dichloroethane, and 12.5 parts of 5% Pd on carbon catalyst was heated with stirring to 40° C. with a hydrogen pressure of 4–5 atm. for 2 hours. Another 875 parts of 1,2-dichloroethane was added and the mixture filtered to remove the catalyst. The residual ethylenic unsaturation of the hydrogenated polystyrene was less than 0.1%. Chloromethylation and amination with aqueous trimethylamine gave a product similar to that described in Example 2(A) having a Gardner color of less than 1.

EXAMPLE 3

Residual unsaturation

Table 1 gives the ethylenic unsaturation of several blends of a hydrogenated polystyrene containing 0.10% residual ethylenic unsaturation (3-1) and an unhydrogenated polystyrene containing 1.53% ethylenic unsaturation (3-7) and the Gardner color rating of the chloromethylated and aminated products made from each blend by the process of Example 1. For a light color electroconductive resin, these data indicate that the intermediate polyvinylaromatic resin should have a residual ethylenic unsaturation of less than 0.30%, and preferably less than about 0.20%.

TABLE I

Residual ethylenic unsaturation v. Gardner color

| Sample | Percent CH=CH$_2$ | Gardner color |
| --- | --- | --- |
| 3-1 | 0.10 | 1 |
| 3-2 | 0.11 | 1-2 |
| 3-3 | 0.13 | 2-3 |
| 3-4 | 0.17 | 2-3 |
| 3-5 | 0.23 | 3-4 |
| 3-6 | 0.29 | 4-5 |
| 3-7 | 1.53 | 8-9 |

EXAMPLE 4

Anionic initiated polystyrene product (A) A sodium-α-methylstyrene anionic initiator was prepared by mixing under nitrogen 6.8 parts of a 50% sodium dispersion in Stoddard solvent with a solution of 29.5 parts of α-methylstyrene in 415 parts of anhydrous tetrahydrofuran purified by distillation from a sodium naphthalene complex. The initiator solution was 0.242 N.

Then to a reactor containing 888 parts of anhydrous tetrahydrofuran and 0.044 mole of the sodium-α-methylstyrene initiator cooled to 0° C. under an inert nitrogen atmosphere was added with good agitation over 40 minutes a solution of 335 parts (3.23 moles) of styrene in 328 parts of tetrahydrofuran. The reaction mixture was held at 0° C. for another 10 minutes and then 2.6 parts (0.044 mole) of acetic acid was added to terminate the polymerization. The product polystyrene was recovered by centrifugation followed by devolatilization. It had an average molecular weight of 15,000 and contained less than 0.3 wt. percent residual unsaturation.

Using the process of Example 1, the anionically initiated polystyrene was chloromethylated to give a chloromethylated polystyrene containing an average of 0.774 chloromethyl groups per aromatic group. Amination with excess aqueous trimethylamine at 35° C. gave an essentially colorless aqueous solution containing 40% of the quaternary trimethyl methyleneammonium salt. Diluted to a 20% solution, the resin had a Brookfield viscosity of 30 c.p.s. at 25° C. and a Gardner color rating of 1.

(B) Table II summarizes the properties of typical quaternary trimethylammonium resins prepared from other alkali metal initiated vinylaromatic polymers.

TABLE II.—CATIONIC RESINS

| No. | Monomer | Initiator | Avg. M.W. | ClCH$_2$/–Ar | Visc.[a] cps. | Color [b] |
| --- | --- | --- | --- | --- | --- | --- |
| 2-1 | α-Methyl-styrene | Na-α-methyl-styrene-THF | 15,000 | 1.00 | 50 | 1 |
| 2-2 | Styrene | n-BuLi | 25,000 | 0.67 | 18.5 | 1 |
| 2-3 | do | Na dispersion in polystyrene/ethyl-benzene | 16,000 | 0.77 | 20 | 1 |
| 2-4 | do | K-naphthalene complex | 20,000 | 0.85 | 360 | 1 |

[a] 20% Brookfield viscosity at 25° C.
[b] Gardner color 20% soln.

EXAMPLE 5

Comparison of polystyrene products

To provide a more detailed comparison of the color and color stability of the quaternary ammonium electroconductive additives prepared from several different polystyrenes, a thermally polymerized polystyrene (5-1) having a weight average molecular weight of about 26,500 was hydrogenated in 1,2-dichloroethane using a 5% palladium on carbon catalyst essentially as described in Example 1(C) and the resulting hydrogenated product (5-2) chloromethylated and aminated in parallel runs with the initial thermal polystyrene and an anionically polymerized polystyrene (5-3) as described in Example 4.

(A) Table III gives the weight average molecular weight, the Gardner color, and the residual ethylenic unsaturation of the initial polystyrenes (PS).

TABLE III.—INITIAL POLYSTYRENE

| No. | Description | Wt. avg. M.W.[a] | Gardner color[b] | Percent unsat.[c] |
|---|---|---|---|---|
| 5-1 | Thermal PS | 26,500 | <1 | 1.66 |
| 5-2 | Hydrogenated PS | 28,000 | <1 | <0.1 |
| 5-3 | Anionic PS | 17,300 | <1 | <0.1 |

[a] Gel permeation chromatography.
[b] 20% in 1,2-dichloroethane.
[c] Iodine chloride method.

Ultraviolet scans of the polystyrenes in tetrahydrofuran revealed a strong absorption for the thermal polymer at 243 mu associated with the residual ethylenic unsaturation. NMR studies of samples 5-1 and 5-2 confirmed the residual ethylenic unsaturation of 5-1 and its disappearance on hydrogenation (5-2).

(B) Each of the polystyrenes was chloromethylated as described in Example 1 to an average of 0.725

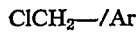

$ClCH_2$—/Ar

After quenching and washing with water samples of each chloromethylated polystyrene were recovered and dried for analysis. Table IV gives the wt. average MW, Gardner color, and residual unsaturation. The significant reduction in residual unsaturation of sample 5-1 reflect probable addition of the chloromethyl methyl ether to the ethylenic double bond to form an unstable $\alpha$-chloro-$\beta$-methoxymethyl derivative.

TABLE IV.—CHLOROMETHYLATED POLYSTYRENE

| No. | Polystyrene | Wt. avg. M.W. | Gardner color[a] | Percent unsat. |
|---|---|---|---|---|
| 5-1 | Thermal PS | 50,900 | 6 | 0.20 |
| 5-2 | Hydrogenated PS | 50,850 | 2 | <0.1 |
| 5-3 | Anionic PS | 29,400 | 1 | <0.1 |

[a] 20% in 1,2-dichloroethane.

(C) The solutions of chloromethylated polystyrene were aminated with excess 25% aqueous trimethylamine as described in Example 1. The 1,2-dichloroethane and excess trimethylamine were removed and the residual aqueous solutions adjusted to 33% solids. The solution from 5-1 was a dark yellow brown with a Gardner color of 8 while the solutions from 5-2 and 5-3 were very light straw yellow with a Garden color of 1.

A portion of each product was dried in vacuo at 25° C. The solid quaternary ammonium resin from 5-1 was a dark brown while the products from 5-2 and 5-3 were colorless solids. All were extremely deliquescent.

(D) To confirm the Gardner color ratings, UV and visible light spectra were obtained for solutions of the chloromethylated polystyrenes (CM-PS) and the corresponding quaternary ammonium derivatives (QN-PS). Typical results are given in Table V.

TABLE V.—VISIBLE SPECTRA-POLYSTYRENE DERIVATIVES

| No. | Drv. | Optical density[a] at— | | | | |
|---|---|---|---|---|---|---|
| | | 550 mu | 500 mu | 450 mu | 400 mu | 360 mu |
| 5-1B | CM-Thermal PS | 0.055 | 0.100 | 0.225 | 0.565 | >1.00 |
| 5-2B | CM-Hydrog. PS | 0.031 | 0.036 | 0.042 | 0.065 | 0.120 |
| 5-3B | CM-Anionic PS | 0.020 | 0.022 | 0.032 | 0.065 | 0.155 |
| 5-1D | QN-Thermal PS | 0.068 | 0.120 | 0.295 | 1.200 | >2.00 |
| 5-2D | QN-Hydrog. PS | 0.042 | 0.049 | 0.059 | 0.085 | 0.128 |
| 5-3D | QN-Anionic PS | 0.055 | 0.068 | 0.083 | 0.130 | 0.225 |

[a] 10% CM-PS in tetrahydrofuran; 10% QN-PS in methanol.

The absorbance of the solutions as measured by the optical densities at visible wavelengths (mu) is in accord with the Gardner color ratings. Indeed the optical density at 400 mu can be used quality control. Thus the optical density at 400 mu for the quaternary ammonium polymer should be less than about 0.22 as a 10% aqueous or methanolic solution. That of the chloromethylated polymer should be less than about 0.10 as a 10% solution in tetrahydrofuran.

EXAMPLE 6

Electroconductive paper coatings

Samples of the soluble quaternary ammonium electroconductive resins described in Examples 1, 2 and 6 were applied with a No. 7 Meyer rod to the sized side of a commercial bleached sulfite base stock paper to give a dried coating weight of 3 lbs./300 ft.$^2$ (about 5 g./m.$^2$). As shown by the data in Table 6, the electroconductive resins prepared from polystyrene with less than 0.3 wt. percent residual unsaturation gave equivalent performance in the surface electric resistance test at 7% RH and 23° C. and a significant improvement in color and color stability as measured by the sensitive reflectance or "brightness" test after accelerated heat aging. The brightness measurements were made with a standardized reflectometer using the procedure of Tappi Method T-452.

TABLE VI.—ELECTROCONDUCTIVE COATINGS

| | Test 6-1 | | Test 6-2 | | |
|---|---|---|---|---|---|
| Resin No. | Ex. 1A | Ex. 2A | None | Ex. 1B | Ex. 4A |
| Init. polystyrene | Therm. | Hydr. | | Therm. | Anionic |
| Percent unsat | 2.96 | 0.12 | | | 0.3 |
| Gardner color[a] | 9-10 | 1-2 | | 8 | 1 |
| Surface resistivity, ohms/sq | 1.6×10$^8$ | 5.8×10$^7$ | 10$^{12}$ | 1.7×10$^8$ | 1.8×10$^8$ |
| Brightness[b]: | | | | | |
| Initial | 79.5 | 81.5 | 83 | 81 | 83.5 |
| 4 hrs. at 104.5° C | 77.5 | 80.0 | 80.5 | 79 | 81 |
| 8 hrs. at 104.5° C | 77.0 | 79.5 | 80 | 78.5 | 80 |
| 24 hrs. at 104.5° C | 76.0 | 78.5 | 80 | 77.5 | 79.5 |

[a] 20% aqueous solution of quaternary ammonium resin.
[b] Tappi Method T-452.

I claim:

1. An electrographic printing paper having incorporated as an electroconductive additive a water soluble electroconductive resin containing an average of about 0.1–1.0 quaternary ammonium groups per aromatic group in an amount effective to increase the electroconductivity of the treated paper, said electroconductive resin being prepared by chloromethylation and amination of a soluble, essentially linear polyvinylaromatic resin having a residual ethylenic unsaturation of less than about 0.3 weight percent calculated as vinyl groups.

2. The electrographic printing paper of claim 1 where the electroconductive resin is prepared from a hydrogenated polyvinylaromatic resin.

3. The electrographic printing paper of claim 1 where the electroconductive resin is prepared from a hydrogenated polystyrene.

4. The electrographic printing paper of claim 1 where the electroconductive resin is an essentially linear polystyrene having a weight average molecular weight of about 15,000 to 60,000 and an average of about 0.4–1.0 quaternary ammonium groups per aromatic group.

5. The electrographic printing paper of claim 4 where the electroconductive resin has an optical density at 400 mu of less than about 0.022 as a 10 weight percent aqueous solution.

6. The electrographic printing paper of claim 4 where the quaternary ammonium groups are mehtylenetrimethylammonium groups.

7. The electrographic printing paper of claim 4 containing about 1–20 weight percent based on dry paper weight of the water soluble electroconductive resin.

References Cited

UNITED STATES PATENTS

| | | | |
|---|---|---|---|
| 3,540,886 | 11/1970 | Ansel et al. | 96—1.8 |
| 3,335,100 | 8/1967 | Geyer | 117—201 |
| 3,110,621 | 11/1963 | Doggett et al. | 117—218 |
| 3,011,918 | 12/1961 | Silvernail et al. | 117—35.6 X |
| 2,597,440 | 5/1952 | Bodamer | 260—85.1 X |
| 2,694,702 | 11/1954 | Jones | 260—93.5 A |

ALFRED L. LEAVITT, Primary Examiner

M. F. ESPOSITO, Assistant Examiner

U.S. Cl. X.R.

96—1.5 R, 1.8; 117—34